Patented Feb. 6, 1923.

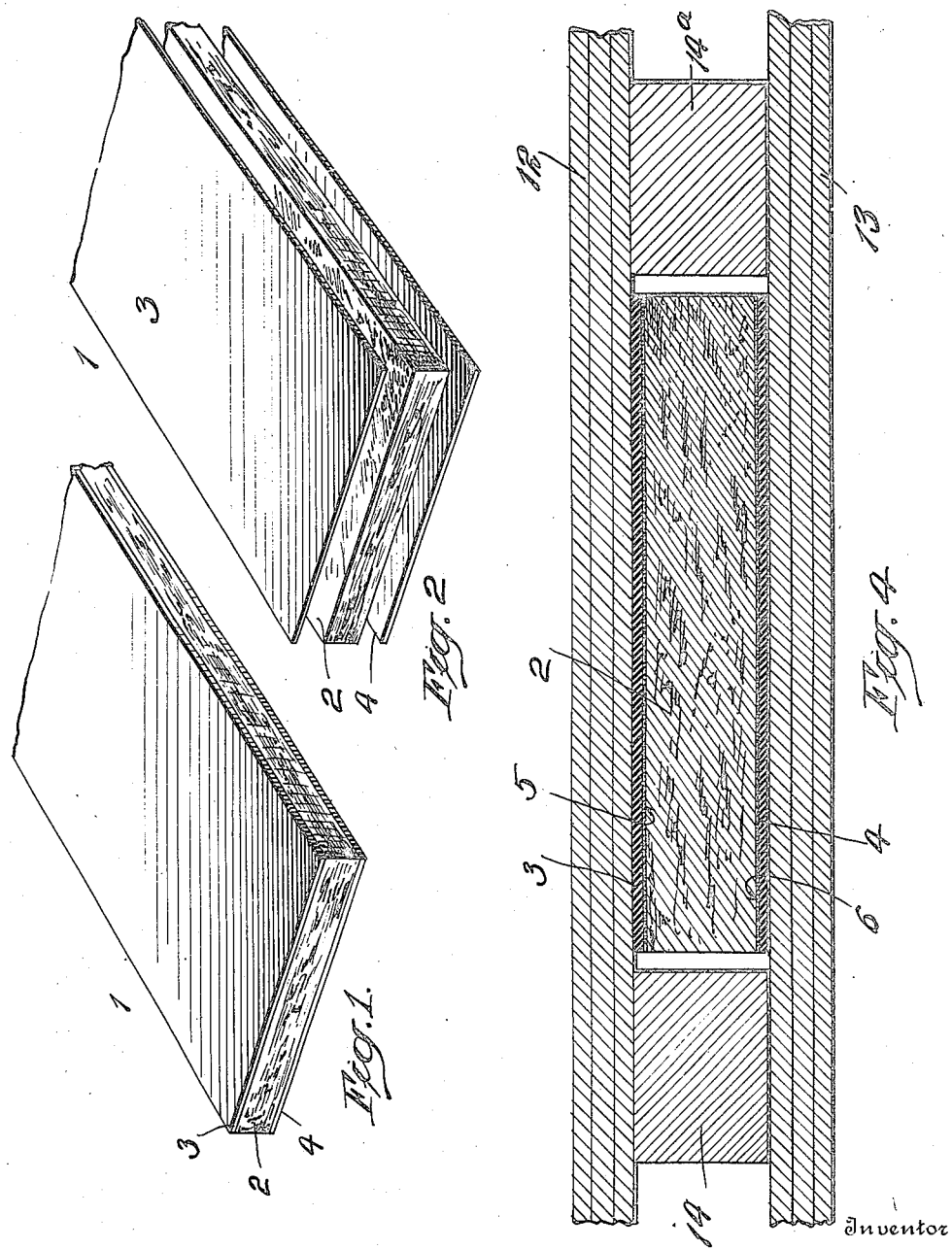

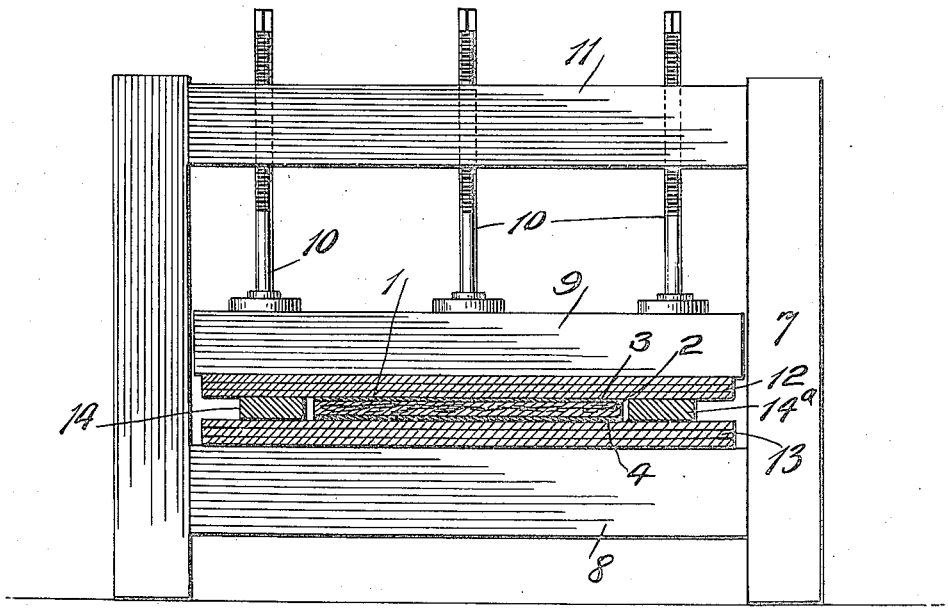
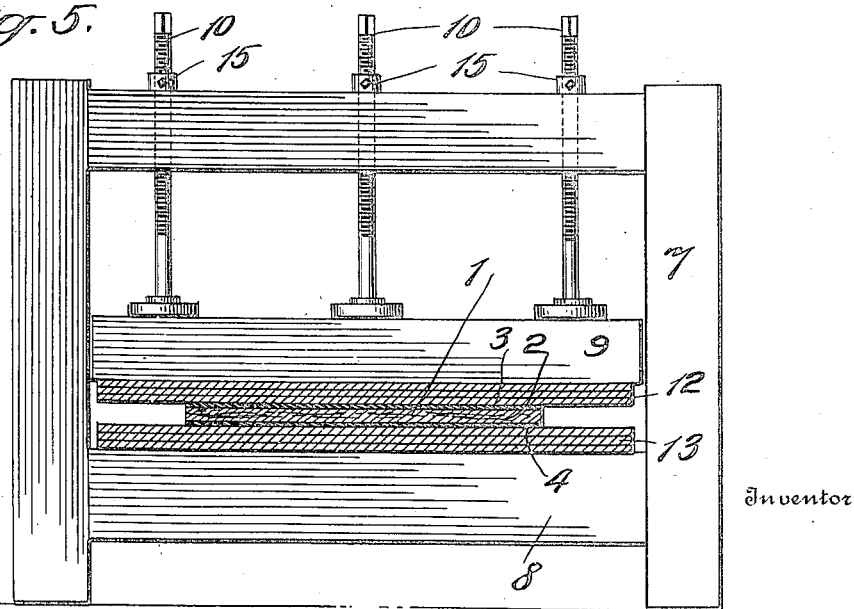

1,444,466

UNITED STATES PATENT OFFICE.

GEORGE H. JONES, OF NEW YORK, N. Y.

COMPOSITE LUMBER OR BEAM STRUCTURE.

Application filed January 11, 1919. Serial No. 270,700.

*To all whom it may concern:*

Be it known that I, GEORGE H. JONES, a citizen of the United States, and a resident of the borough of Manhattan, city, county, and State of New York, have invented certain new and useful Improvements in Composite Lumber or Beam Structures, of which the following is a specification.

In the production of composite lumber or beam structures formed of a relatively thick core of a wood of light specific gravity, such as balsa wood, and relatively thin surface layers of a hard and tenacious material such as tough fibre fastened on the opposite sides of said core, it will be understood that such light-wood core will, for example, in such a beam, form the main or basic structural element and that it is extremely light, porous, soft, pithy and easily fracturable. It will furthermore be understood that this wood readily absorbs water and is, therefore, preferably suitably treated by the use of paraffin to make it waterproof and preserve it. When a beam with such a core and surface layers is made, it will have greater advantages of structure and strength than is inherent in a beam of similar dimensions wholly composed of the tougher and heavier material while it possesses much less weight. It has also been found that the tenacity and elasticity of such a composite beam are respectively very much greater than the sums of the tenacities and elasticities of the component parts or materials and also greater than the tenacities and elasticities of beams of similar dimensions composed of the heavier material, while it is of course very much lighter in weight. Such a beam structure is, in effect, an I-beam or a T-beam, and from an engineering standpoint must be figured in the same manner as such beams according to the disposition of the surface layers of tough material on only one surface or on opposite surfaces. Thus assuming that a balsa wood core, web or trunk is disposed between opposite layers of hard and tough fibre, an I-beam is, in effect, produced wherein the outer tough layers of fibre will act similarly to the flanges of an I-beam while the balsa wood trunk or body will act similarly to the web of such a beam; that is to say, the strength of the complete structure is caused to be transferred toward the said outer, tough layers or flanges and the core or web of balsa wood, not only forms the major part of the composite beam so as to afford extreme lightness in weight, but also transmits stresses toward the outer portions of the said beam, and it combines in one integral structure the desirable characteristics of great structural strength, extreme lightness and weight, resistance to strains of compression, crushing, shearing and torsion, as well as surface hardness. A beam so constructed will furthermore cause any local strain applied at the hard surface or surfaces to be distributed over a considerable area adjacent to the place of application of the stress or pressure causing such local strain.

It is the primary object of this invention to procure by the use of a cementitious material a thorough and secure adhesion of the relatively thin layers of fibre or like material to a core so treated to the end that the said fibre surface layers and light wood core will have a close and substantally inseparable union over all parts of the cemented or glued surface. My invention thereby, in a greater degree than would otherwise be possible, causes said layers and core to act as a single unit or body to resist any pressure or strain placed thereon, and it will be understood that the stronger the union between the surface layers and the core the better these two parts of the structure will cooperate with each other to produce a perfect beam with a maximum of the strength and the other desirable qualities hereinabove specified. In the preferred construction of my composite beam, I employ a core of the tropical wood known as balsa wood (*Ochroma lagopus*) which has first been treated with paraffin to preserve and waterproof it and a surface layer or layers of a hard tough fibre which I glue to the said core in such a manner as to procure a thorough and secure adhesion between the surfaces of said outer layers and said core. To procure this thorough and secure adhesion, it is impossible to use ordinary aqueous glue as the paraffin in the core repels the water in the glue and prevents the formation of such a thorough and complete adhesion. I therefore employ a cementitious material of a non-aqueous character and preferably an alkaline glue composed of a colloid, such as casein, combined with an alkali such as lime. A material of this character formed approximately of three parts of casein to one part of lime in powdered form may be obtained in the public market, which upon the addition to the said powder of about two parts of water to one of the powdered mixture of lime and casein produces such an alkaline glue. This glue mixture, however, will not of itself form a close union with the treated core and in order to blend the paraffin in and on such core with the aforesaid glue, I preferably add to the glue mixture so formed a paraffin solvent which, in the preferred embodiment of my invention, comprises about two to four per cent of a suitable hydrocarbon such as kerosene. The addition of such a solvent hydrocarbon to the mixture in no way affects the adhering qualites of the glue and I am thus enabled to procure a very close adhesion between the said core and the fibre layers.

In gluing the said fibre to the core it is of course necessary to use pressure and it is another object of my invention so to limit the amount of pressure employed as to secure a thorough adhesion and close union, while at the same time preventing the crushing of the cellular tissue or tiers of cells of the balsa or like wood adjacent to the glued surface, as otherwise a crack or fissure parallel to said glued surface in the said core will occur with the result that the beam will be very materially weakened along this fissure or crack.

To this end, therefore, when pressure is applied in a gluing press, I carefully measure the thickness of the core, the thickness of the surface layers of fibre; preferably provide space between such layers for the film or films of cementitious material between the same and then limit the movement of the press. This is preferably accomplished by the use of guide strips which are placed on opposite sides of the composite beam to be glued and while enabling a proper degree of pressure to be applied thereto prevent the crushing of the cellular tissue of the balsa or like wood as hereinabove set forth.

Other objects of my invention will be in part obvious from the annexed drawings and in part indicated in connection therewith by the following analysis of this invention.

This invention accordingly also consists in the features of construction, combinations of parts, and in the unique relationship of the members and in the relative proportioning and disposition thereof, all as more completely outlined in the following specification and in said drawings.

To enable others skilled in the art so fully to comprehend the underlying features of my invention that they may embody the same by numerous modifications in structure and relationship of parts contemplated by this invention, drawings depicting a preferred form have been annexed as a part of this disclosure, and in such drawings like characters of reference denote corresponding parts throughout all the views, of which:—

Fig. 1 is a view in perspective of a portion of the beam embodying my invention;

Fig. 2 is a view similar to Fig. 1 showing the core and layers of the fibre separated from each other;

Fig. 3 is a front elevation of a press showing a composite beam in the process of having its core and surface layers glued together;

Fig. 4 is an enlarged fragmentary view of the blanketing boards of the press shown in Fig. 3 with the composite beam and guide strips therebetween; and Fig. 5 is a front elevation of the press embodying a modified form of pressure limiting device.

Referring now to these drawings, 1 indicates a composite beam structure formed of a core 2 and top and bottom surface layers 3 and 4 respectively. The core 2 provides the main or basic structural element of the beam and is composed of a wood of light, specific gravity which is soft, porous, pithy and easily fracturable, and preferably of the species known as balsa wood (*Ochroma lagopus*). This wood readily absorbs water and is preferably treated with paraffin to preserve it and make it waterproof. This wood is preferably treated to encyst the cells and pores thereof substantially in accordance with Reissue Letters Patent to Marr, No. 13,952. Said core, while possessing the desirable characteristic of lightness in weight and while having as a whole a maximum of structural strength relatively to its weight and great resistance to strains compression and torsion, is as aforesaid relatively soft, porous and pithy in structure and offers but little resistance to local fracture or depression. The upper and lower surface layers 3 and 4 respectively are composed of a hard and tenacious material preferably of tough fibre and each of these surface layers is preferably glued to said preserved and waterproofed core 2 in such a manner as to procure, by the use of a cementitious material, a thorough and secure adhesion of the relatively thin layers of fibre or like material to a core so treated, to the end that said fibre surface layers and light wood core will have a close and substantially inseparable union over all parts of the cemented or glued surface. To procure this thorough and secure adhesion it is impossible to use ordinary aqueous glue as the paraffin in the core repels the water in the glue and prevents the formation of such a thorough and complete adhesion. I therefore employ a cementitious material of non-aqueous character and preferably an alkaline glue composed of a colloid such as casein combined with an alkali such as lime. A material of this character, formed approximately of three parts of casein and one part of lime may be obtained in powdered form in public market and will, upon addition to the powder of about two parts of water to one of such powdered mixture of lime and casein, produce an alkaline glue of a character suitable for use in my invention. This glue mixture, however, will not of itself form a close union with the treated core and in order to blend paraffin in such core with the aforesaid glue, I preferably add to the glue mixture so formed a paraffin solvent which, in the preferred embodiment of my invention, comprises about two to four per cent of a suitable hydrocarbon such as kerosene. The addition of such a solvent hydrocarbon to the mixture in no way affects the adhering qualities of the glue, and by utilizing suitable films 5 and 6 respectively at opposite sides of the core and between the same and the fibre surface layers, I am, by the use of pressure properly applied, enabled to procure a very close adhesion and joint between the said core and surface layers. In gluing the said fibre to the core it is necessary in practice that the amount of pressure employed be limited to an amount which will be sufficient to procure a thorough adhesion between the glued surfaces while at the same time preventing the crushing of the structural tissue or tiers of cells of the core which lie adjacent to the glued surfaces, as otherwise a crack or fissure parallel to said glued surface in the said core will occur with the result that the beam will be very materially weakened along this fissure or crack. For this purpose, therefore, I preferably limit the degree of relative movement of the press parts.

In Fig. 3 I have shown a front elevation of the press comprising a suitable frame 7 having a stationary base beam 8 and a plunger beam 9 adapted to be moved into pressing relatively to the base beam 8 by means of screw 10 which are mounted in a head beam 11. Between the base beam 8 and plunger beam 9 are inserted in the usual conventional manner blanket boards 12 and 13 respectively, and between such blanket boards a composite beam 1 is shown in the course of the gluing operation. The movement of the screws and beam 9 and blanket board 12 relatively to the base beam 8 and blanket board 13 is limited by the insertion between the blanket boards of guiding strips 14—14$^a$ on opposite sides of the beam 1. These guiding strips 14—14$^a$ are of hard wood and of a carefully measured thickness which equals the thickness of the balsa wood core and surface layers, proper allowance being made for the film of glue or cementitious material between the surface of said layers and core. The provision for this film of glue is important because if allowance is not so made for such film of glue, substantially all of the glue will be squeezed out by the press and it will be impossible to procure as good a joint as if a suitable film of glue is permitted to remain between the surfaces. I am thus enabled to apply a proper degree of pressure which will produce a close adhesion between the said parts but will prevent the crushing of the cellular tissue of the balsa or like wood as above set forth.

My invention thus in a greater degree than would otherwise be possible, causes said layers and core to act as a single unit or body to resist any pressure or strain thereon and it will be understood that the stronger the union between the surface layers and the core the better these two parts of the structure will cooperate with each other to produce a perfect beam structure with a maximum of the strength and other desirable qualities hereinabove referred to.

In Fig. 5 I have shown a modified form of pressure limiting device which is in all respects similar to the device shown in Fig. 3 except that instead of the limiting strips 14—14$^a$ I provide limiting collars 15 on the screws 10. These limiting collars are carefully positioned in relation to the extent of movement of the screws to provide a suitably limited space between the blanketing boards 12 and 13 between which the beam 1 is disposed, provision being made in such space for the thickness of the core, the surface layers and preferably of the films of glue for the reasons hereinabove specified.

Having described my invention, I claim:

1. A composite lumber or beam structure composed of a core of wood having substantially the characteristics of balsa wood, which core has been treated with paraffin to encyst the cells and pores thereof, and a relatively thin surface layer of hard and tenacious material secured to said treated core by a film of a casein glue and a paraffin solvent mixed therewith.

2. A composite lumber or beam structure composed of a core of wood having substantially the characteristics of balsa wood, which core has been treated with paraffin to encyst the cells and pores thereof, and a relatively thin surface layer of hard and tenacious material secured to said treated core by a film of a glue formed of casein, lime, a quantity of water sufficient to combine the casein and lime, and kerosene mixed therewith.

3. A composite lumber or beam structure composed of a core of balsa wood, which core has been treated with paraffin to encyst the cells and pores thereof, and a relatively thin surface layer of hard and tenacious material secured to said treated core by a film of a glue formed of casein, lime, a quantity of water sufficient to combine such casein and lime, and kerosene mixed therewith.

In witness whereof, I have signed my name to the foregoing specification in the presence of two subscribing witnesses.

GEORGE H. JONES.

Witnesses:
JOSEPH F. O'BRIEN,
CHARLES J. GALE.